Patented Sept. 11, 1928.

1,683,694

UNITED STATES PATENT OFFICE.

WALTER A. PATRICK AND ERNEST B. MILLER, OF BALTIMORE, MARYLAND, ASSIGNORS TO THE SILICA GEL CORPORATION, OF BALTIMORE, MARYLAND, A CORPORATION OF MARYLAND.

METHOD OF MANUFACTURING SULPHURIC ACID.

No Drawing.   Application filed May 24, 1924.   Serial No. 715,728.

The present invention relates to the manufacture of sulphuric acid, more particularly by the contact process.

The principal objects of the invention are, to increase the velocity of the conversion of sulphur dioxide to sulphur trioxide or, what is substantially the same thing, obtaining the present velocity of conversion with a smaller quantity of the catalytic agent, or a less mass of the carrier; to provide a carrier better adapted for use in the converter; and to make it possible to manufacture economically when using low concentration of sulphur dioxide.

To these ends, the invention consists in oxidizing sulphur dioxide to sulphur trioxide in the presence of an excess of oxygen by the action of a catalyzer associated with a carrier having ultra-microscopic pores. For the purpose of providing a test for the size and number of pores in the carrier, it may be said that the carrier, when in equilibrium with water vapor at 30° C. and about 22 mm. of mercury partial pressure, should have adsorbed the vapor to such an extent as to contain at least 21% of its own weight (dry) of water.

Preferably, the material used for effecting the oxidation of the sulphur dioxide is silica gel impregnated with platinum. To distinguish the silica gel required for the present invention from products that are the same chemically, but not physically, the test mentioned above may be employed. That is to say, the silica gel suitable as a carrier in the present invention should have sufficient fine pores so as to absorb water vapor to such an extent as to contain at least 21% of its own weight (dry) of water when in equilibrium with water vapor at 30° C. and a partial pressure of about 22 mm. of mercury.

The impregnated gel may be manufactured by treating such a silica gel, but the gel should not be thoroughly dried before being subjected to the process of impregnation. To the gel, containing for example 30 to 40% water, is applied a solution of a substance which upon proper treatment gives the catalytic agent. Thus the partially dried gel may be treated with a solution of ammonium chlorplatinate and the mixture heated to about 360° centigrade. The product is a hard porous gel impregnated with finely divided platinum, the gel acting as a carrier. Of course the gel may be impregnated in other ways.

This material is very hard and may be freely handled without any danger of injuring the same. Furthermore, it is ideal for use in the form of a bed through which the stream of gases may pass, as it will not crush like many other masses. The gel has an enormous surface area and, when the platinum or other catalytic agent is associated therewith, the amount of agent exposed for catalytic action is much greater than in connection with any other carrier. Consequently, with a silica gel impregnated with platinum, the production of sulphuric acid per unit weight of platinum per unit of time is much greater than with the masses ordinarily used. In practice, this advantage may be utilized in any one of several ways. The converter may be charged with the same quantity of carrier as used heretofore, but containing a smaller percentage of platinum and yet the same conversion and the same production of acid will be obtained; or, the same percentage of platinum as in the asbestos or magnesium sulphate carriers may be employed, in which case only a fraction of the quantity of mass now used would be required. Either way results in a saving of platinum. Actual operation has shown that the impregnated gel has about twelve times the activity of present catalytic masses.

Another very important result of having such a highly active catalytic mass is that it makes possible the economical production of sulphuric acid by the contact process from more dilute sulphur dioxide air mixtures than have been employed heretofore. With very dilute mixtures is is merely necessary to employ a greater percentage of platinum. For general use, the amount of platinum in the gel is about 0.025% of the weight of the gel (dry). If a dilute mixture, say containing 3% $SO_2$, is employed, then a silica gel mass having a higher percentage of platinum would be used. The amount of platinum in a silica gel mass, for general use, is only about one-twelfth that required in other masses. Consequently, for dilute mixtures, the amount of platinum in the silica gel mass may be increased, and yet be considerably less than required with other masses. In other words, the cost of a platinum impregnated gel mass in a contact sulphuric acid plant is a fraction only of the cost of the masses now employed.

Another feature of importance is that the employment of impregnated silica gel makes the operation of the contact process less delicate than when either the asbestos or magnesium sulphate mass is used. This is particularly true in regard to the water content of the gases entering the converter. With the prior masses, the water content of the gases must be controlled very accurately; best results being obtained with about 0.025 grams water per cubic foot of gases. With the mass of the present invention, the water content may be much greater without decreasing the efficiency of the conversion, and variation of the water content within limits does not affect said efficiency. In other words, it is possible to operate satisfactorily with a much less accurate control of humidity than heretofore.

Although the invention has been described as employing impregnated silica gel, it is to be understood that the invention is not thus limited but includes other materials carrying the catalytic agent, which materials have a physical structure similar to that of silica gel.

What we claim is:

1. In the manufacture of sulphuric acid by the contact process, the step of contacting sulphur dioxid and a gas that will supply oxygen with an active mass consisting of a hard porous gel having associated therewith a substance capable of catalyzing sulphur dioxid to sulphur trioxid, said gel having pores of such size that it will adsorb water vapor to such an extent as to contain at least 21% of its own weight of water when in equilibrium with water vapor at 30° C. and a partial pressure of 22 mm. of mercury.

2. The process according to claim 1 wherein the gel is silica gel.

3. The process according to claim 1 wherein the active mass is silica gel having a metal associated therewith.

4. The process according to claim 1 wherein the active mass is silica gel having platinum associated therewith.

5. The process according to claim 1 wherein the active mass is silica gel having less than one per cent. of its weight of platinum associated therewith.

6. The process according to claim 1 wherein the catalytic substance is present in an amount less than one per cent of the weight of the gel.

In testimony whereof we hereunto affix our signatures.

WALTER A. PATRICK.
ERNEST B. MILLER.